Oct. 18, 1960

A. PACCIARINI ET AL 2,956,614

MACHINES FOR BUILDING PNEUMATIC TIRES

Filed Sept. 13, 1956

INVENTORS
Antonio Pacciarini and
Dario Giletta

BY Stevens, Davis, Miller & Mosher
ATTORNEYS

Oct. 18, 1960 A. PACCIARINI ET AL 2,956,614
MACHINES FOR BUILDING PNEUMATIC TIRES
Filed Sept. 13, 1956 2 Sheets-Sheet 2

INVENTORS
Antonio Pacciarini and
Dario Giletta

BY
ATTORNEYS

United States Patent Office 2,956,614
Patented Oct. 18, 1960

2,956,614

MACHINES FOR BUILDING PNEUMATIC TIRES

Antonio Pacciarini and Dario Giletta, Milan, Italy, assignors to Pirelli S.p.A., Milan, Italy Filed Sept. 13, 1956, Ser. No. 609,700

Claims priority, application Italy Oct. 13, 1955

12 Claims. (Cl. 154—9)

The present invention relates to a method and apparatus for controlling the collapsing and expansion of tire building drums.

It is conventional practice in the tire building art to construct pneumatic tires in the shape of a sleeve or band by successively applying the various elements that are used to build up the body of the tire about the substantially cylindrical outer surface of a drum or building form which is rotated while certain tire building operations are being performed and whose rounded shoulders are covered with an adhesive material previously applied thereon. The internal diameter of the tire at its beads, which are built on said shoulders, is smaller than the outer periphery of the building drum and, therefore, in order to slip the finished tire from the drum it is indispensable that the latter be collapsible. Consequently, the tire building drums presently employed comprise a plurality of arched segments, the outer surfaces of which form a continuous cylindrical surface when the drum is in expanded position. The segments are supported by articulated arms connected in part to a hub rigidly associated with the shaft that rotates the drum and in part to a sleeve freely mounted on said hub and normally rotating therewith. The articulated arms are provided in such a way that upon rotating the sleeve in one direction with respect to the hub, the arched segments constituting the drum are folded and partially superimposed toward the center to the extent necessary for the withdrawal of the finished tire. By rotating the sleeve with respect to the hub in a direction opposite to the previous one, the collapsed drum is brought to its original cylindrical form.

For the collapsing, it is possible to achieve the relative rotation between the hub and the sleeve by causing the shaft on which is mounted the building drum to rotate at a certain speed and then suddenly applying a braking force while holding the sleeve against rotation in such a way that the shaft and the drum continue to rotate by inertia. However, since the adhesive joint between the drum and the finished tire is of a viscous nature and since the effort of opening it is instantaneous, it is necessary, to insure a reliable operation, that a high force of inertia be imparted to the drum so as to cause it to rotate at a very high speed before applying the brake. Consequently, the residual force of inertia, after the adhesive joint has come apart, is such as to thrust the arched stave segments against their respective stops with impacts of considerable force which seriously impair the life and efficiency of the drum.

This invention has for its object a device which permits opening and closing the tire building drum by means of a torque which acts between the sleeve and the hub of the drum in such a way as to prevent the aforesaid impacts.

The characteristic principle of the invention resides in the fact that the relative rotation between the hub and the sleeve is obtained by lacking the shaft on which the hub is rigidly fastened and thereafter rotating the sleeve through the necessary angle.

These and other characteristic features of the present invention will be apparent from the following description of the same, reference being had to the accompanying drawings wherein.

Figure 1:
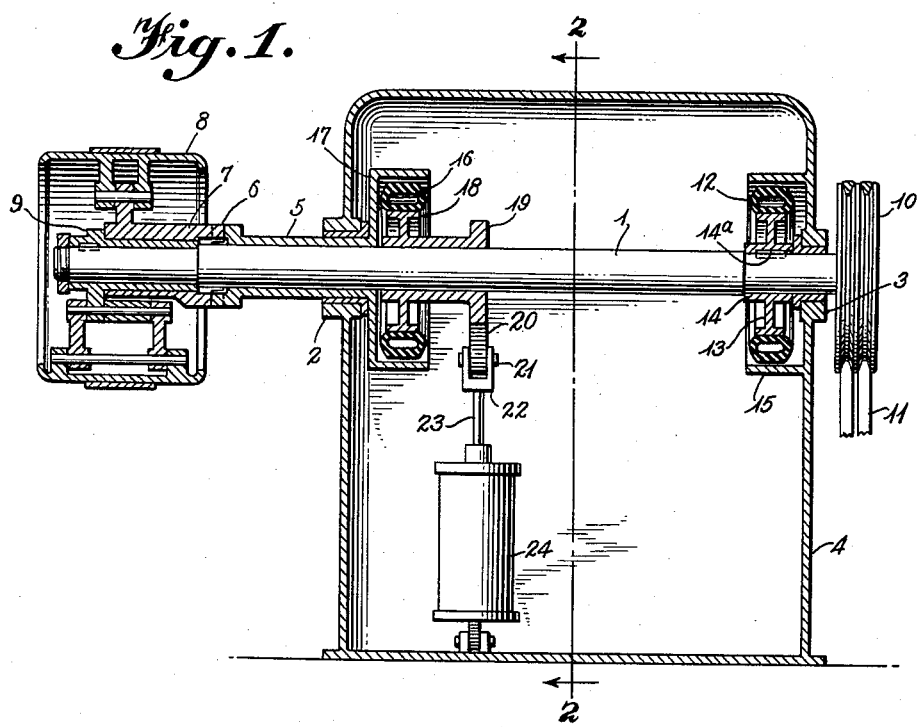
Fig. 1 is a side elevation partly in section of the drum supporting framework.
Figure 2:
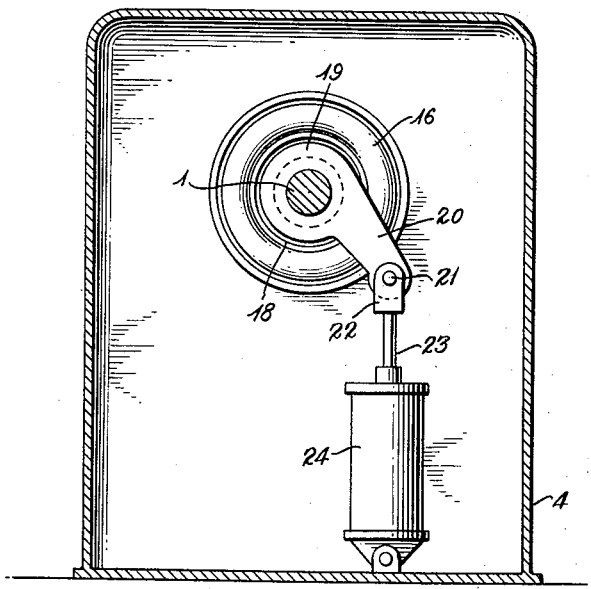
Fig. 2 is a section taken on the line indicated at 2—2 in Fig. 1 showing the device which controls the rotation of the sleeve of the drum with respect to the supporting hub.

Drive shaft 1 is carried by supports 2 and 3 of framework 4. A sleeve 5 is received on drive shaft 1, projects through and is bearing supported by support 2 and is connected at one end by means of a geared coupling 6 with sleeve 7 of building drum 8 mounted on shaft 1. Shaft 1 also carries, rigidly keyed thereto, hub 9 of drum 8. At the opposite end of shaft 1 is keyed a pulley 10 driven by a motor, not shown in this figure, by means of small trapezoidal endless belts 11. Close to pulley 10, there is mounted at the end of shaft 1 a pneumatic connection constituted of an annular hollow inflatable air chamber 12 of substantially rectangular cross section inserted between pulley 13, rigidly associated with shaft 1 by means of hub 14 and key 14a, and a cup-shaped or annular member 15 integral with framework 4.

Figure 3:
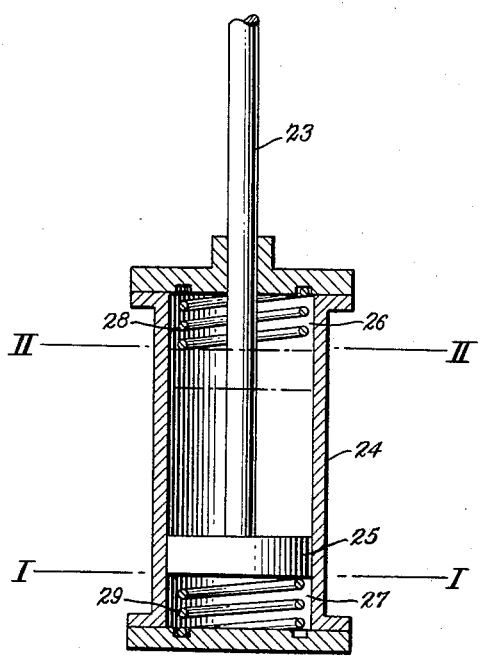
Fig. 3 is a view showing the double acting piston; the retiming device.

The interior of air chamber 12 is connected by means of a three-way electrically controlled valve with a source of compressed air and with a discharge outlet. A second pneumatic connection, of a type analogous to the one described, is provided close to support 2, and the air chamber 16 thereof is inserted between a cup-shaped member 17 formed integral with one end of sleeve 5, and a pulley 18 rigidly associated with sleeve 19 rotatably received on shaft 1. The interior of air chamber 16 is connected by means of the same three-way electrically controlled valve with a discharge outlet and with a source of compressed air. Sleeve 19 carries oscillating crank 20, connected by means of pin 21 to a small fork 22, at the end of a piston rod 23. In cylinder 24, attached to the base of framework 4, is located a piston 25 connected with its piston rod 23. On the two heads 26 and 27 of said cylinder are mounted two springs 28 and 29 capable of overcoming the passive resistance of piston 25. These springs are compressed by piston 25 when the latter, during its stroke, passes beyond positions indicated by lines I—I and II—II, respectively, shown in Figure 3.

Figure 4:
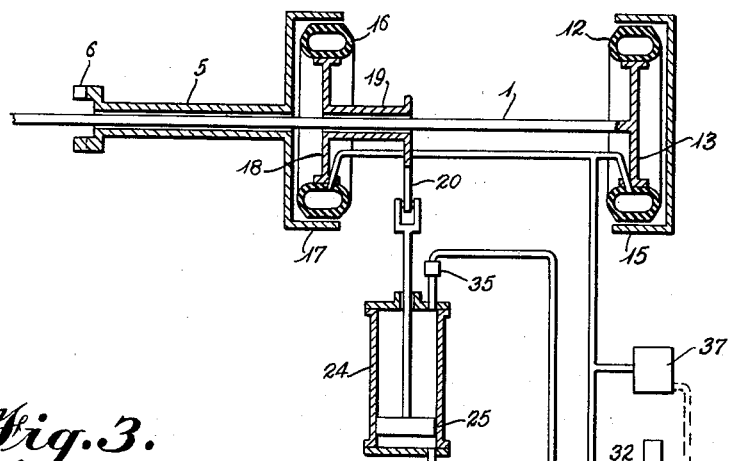
Fig. 4 is a schematic view showing the means by which the various pneumatic operations and the piston actuating the device are controlled.

Figure 4 shows diagrammatically the pneumatic control system for air chambers 12 and 16 of the pneumatic couplings and of cylinder 24. In this view numeral 30 represents the pipe line for the supply of compressed air, and numerals 31, the pressure reducing valve, and 32, 33 and 34, the three-way electrically controlled valves. Numerals 35 and 36 represent the flow control means and 37 a relief by-pass valve.

Based upon the foregoing description, it is possible to explain the operation of the various elements thereof.

It will be seen that in order to effect the collapsing of the drum, the valve 32 is actuated by a suitable electrical contact, manually or automatically, so as to deliver compressed air to chambers 12 and 16 of the pneumatic couplings until the pressure has caused the necessary expansion to bring about coupling of the pulley 13 with annular member 15 and the pulley 18 with cup-shaped member 17. In this manner, air chamber 12 functions to rigidly associate shaft 1 with the framework of the machine, thus preventing the rotation thereof in either direction, whereas chamber 16 rigidly associates crank 20 with sleeve 5 and, consequently, by means of geared joint 6, also with sleeve 7 which controls the collapsing of building drum 8. When the pressure in the chambers 12 and 16 has reached the required point, the relief by-pass valve 37 will pass compressed air via three-way electrically controlled valve 34 to the lower chamber of cylinder 24, causing the piston 25 to be raised upwardly starting from its position I—I. The piston, during its stroke, causes, by means of small fork 22, the rotation of crank 20, and the latter, by means of the coupling action of air chamber 16 which connects pulley 18 to cup-shaped member 17, controls the rotation of sleeve 5 and, thus, the rotation of sleeve 7 of drum 8 with respect to hub 9 of the drum itself which, being held rigidly with shaft 1, is immobilized by the air chamber 12 of the coupling mounted in the interior of annular member 15. Such rotation will terminate when the segments of the drum arrive at their respective stops. The piston, during this rotation, moves between positions I—I and II—II. The speed of this stroke is controlled by means of flow control means 35 and 36.

The relative rotation of sleeve 7 of the drum with respect to hub 9, determines the movement of the articulated arms on which are fastened the segments of the drum and, hence, the collapsing of the drum itself.

At this point, air is discharged by means of valve 32 from chambers 12 and 16, thereby releasing shaft 1 and freeing sleeve 5, and consequently sleeve 9 of the drum, from crank 20, the discharge of air from the lower part of cylinder 24 being at the same time controlled by means of valve 34.

The reverse operation of opening or expanding is effected by again introducing air into chambers 12 and 16. After reaching the predetermined pressure in said chambers the relief by-pass 37 controls, by means of valve 33, the introduction of compressed air into the upper chamber of cylinder 24. The piston 25 is then moved downwardly from the position II—II previously arrived at, to position I—I thereby effecting the complete expansion of drum 8.

The stroke of piston 25 theoretically necessary to cause opening and closing of building drum 8 is that which goes from position I—I to position II—II and which determines the rotation of crank 20 at the predetermined angle. If only rigid elements were employed, the actual stroke of piston 25 would correspond to the theoretical. However, since there have been employed also resilient means in the device described above, such as the pneumatic couplings, which are susceptible to slippage, it may happen that the theoretical stroke is not sufficient to open or close the drum. For this reason, provision is made for piston 25 to move an additional distance from position I—I to the lower wall of the cylinder for the expansion phase of the drum and from position II—II to the upper wall of the cylinder for the collapsing phase of the drum. In the event that the theoretical stroke is exceeded, the piston would no longer stop at positions I—I and II—II, respectively, but would pass beyond. When this phenomenon is repeated in the succeeding operations, the piston would start from positions more and more removed from I—I or II—II and the supplemental distances of movement would, therefore, be gradually completely utilized. The piston would arrive at the end of its stroke in either direction without having completely collapsed or expanded the drum.

In order to avoid this drawback there are provided two springs 28 and 29, mounted respectively on the heads of the double acting cylinder 26 and 27 facing toward piston 25. Whenever the piston is obliged in the course of its stroke to move beyond position I—I or position II—II, it compresses spring 29 or spring 28, respectively. As soon as the pressure is released from the air couplings 12 and 16, spring 29 or spring 28, respectively, acts upon piston 25 to return it to positions I—I or II—II.

What is claimed is:

1. In a drum capable of being collapsed and expanded by the relative rotation of a hub and sleeve, the improvement which comprises a first coupling for linking the drive shaft to an element of a stationary framework, a second coupling for connecting a second sleeve freely rotatably mounted on the drive shaft to the sleeve of said drum, a crank connected at one end thereof to said second sleeve and pivoted at its other end to a connecting rod of a double acting piston, and means for reciprocating said piston and rod.

2. In a tire-building apparatus of the type including a frame, a drive shaft journalled in said frame, and a collapsible drum having a first element keyed to said drive shaft and having a second element freely rotatably mounted on said drive shaft whereby said drum may be collapsed and expanded by means of the relative angular movement between said two elements, the improvement which comprises a brake means connected between said shaft and said frame for locking said shaft against rotation, clutch means having its driven part connected to said second element, and means connected to the driving part of said clutch means for rotating said second element relative to said drive shaft whereby said drum can be collapsed and expanded when in a stationary condition.

3. In a tire-building apparatus of the type including a frame, a drive shaft journalled in said frame, and a collapsible drum having a hub portion keyed to said shaft and a sleeve portion freely rotatably mounted on said shaft in the interior of said drum, the improvement comprising a pulley keyed to said drive shaft, a ring fixed to said frame radially spaced from said pulley, an annular inflatable member mounted on the periphery of said pulley for coupling said pulley and said ring when inflated, a second sleeve mounted on said drive shaft mechanically connected to said first-mentioned sleeve, a second pulley freely rotatably mounted on said drive shaft, a second annular inflatable member mounted on the periphery of said second pulley for coupling when inflated said second pulley and said second sleeve, and means to rotate said second pulley.

4. In apparatus as defined in claim 3 the further improvement wherein said means for rotating said second pulley includes a crank fixed to said second sleeve, a piston rod pivotally connected to said crank, a double acting piston mounted on said piston rod, and a cylinder slidably receiving said piston.

5. In apparatus as defined in claim 4 the further improvement of a spring mounted in each end of said cylinder to cooperate with said piston to return it to a preselected position upon the completion of a stroke of said piston.

6. In apparatus as defined in claim 4 the further improvement of conduit means for leading compressed fluid to said inflatable members and said cylinder, and means for controlling the passage of compressed fluid through said conduit means for inflating said inflatable members prior to the admission of compressed fluid to said cylinder.

7. In a tire-building apparatus of the type described wherein there is included a frame, a rotatable shaft journalled in said frame, and a rotatable and collapsible drum mounted on said shaft and having a first element thereof keyed to said shaft and a second element freely rotatably mounted on said shaft, whereby said drum can be collapsed and expanded by means of the relative angular movement between said elements, the improvement which comprises means for connecting said shaft to said frame so as to prevent the rotation of said shaft, and means for rotating said second element relative to said shaft through a predetermined angular movement.

8. In a tire-building apparatus of the type described wherein there is included a frame, a shaft journalled in said frame, and a rotatable and collapsible drum mounted on said shaft and having a first element thereof keyed to said shaft and a second element freely rotatably mounted on said shaft, whereby said drum can be collapsed and expanded by means of the relative angular movement between said elements, the improvement which comprises means for disengageably connecting said shaft to said frame so as to prevent the rotation of said shaft only when said drum is stationary, and means for thereafter rotating said second element relative to said shaft through a predetermined angular movement for collapsing and expanding said drum.

9. In a tire-building apparatus including a rotatable and collapsible drum of the type having a plurality of arched segments whose outer surfaces form a continuous cylindrical surface when the drum is in an expanded condition, said segments being folded and partially superimposed toward the center of the drum when said drum is in a collapsed condition, wherein the collapsing of said drum is normally effected by braking, while the drum is still rotating, one of two rotatable and concentrically mounted elements in said drum, while the other of said elements continues to rotate by inertia relative to the first said element, the improvement which comprises means for securing one of said elements against rotation when said drum is stationary, and means for thereafter rotating the other of said elements through a predetermined angular movement relative to the one said element.

10. In a tire-building apparatus of the type described including a frame, a shaft journalled in said frame and a collapsible drum having a pair of elements concentrically arranged with respect to said shaft and rotatable relative to one another to permit expansion and contraction of said drum and wherein one of said elements is keyed to said shaft and the other of said elements is freely rotatably mounted thereon, the improvement which comprises a first pulley keyed to said shaft adjacent said frame, a first annular flange attached to said frame and extending outwardly therefrom coaxially with said shaft, said first annular flange surrounding said first pulley and forming therewith a first annular space, a second pulley freely rotatably mounted on said shaft and operatively connected with said second element, a sleeve freely rotatably mounted on said shaft and having an annular flange surrounding said second pulley and forming therewith a second annular space, a first toroidal shaped and expansible member located in said first annular space, a second toroidal shaped member in said second annular space, means for inflating said toroidal shaped members, and means for rotating said sleeve through a predetermined annular movement.

11. In a tire-building apparatus of the type described including a frame, a shaft journalled in said frame and a collapsible drum having a pair of elements concentrically arranged with respect to said shaft and rotatable relative to one another to permit expansion and contraction of said drum and wherein one of said elements is keyed to said shaft and the other of said elements is freely rotatably mounted thereon, the improvement which comprises a first pulley keyed to said shaft adjacent said frame, a first annular flange attached to said frame and extending outwardly therefrom coaxially with said shaft; said first annular flange surrounding said first pulley and forming therewith a first annular space, a second pulley freely rotatably mounted on said shaft and operatively connected with said second element, a sleeve freely rotatably mounted on said shaft and having an annular flange surrounding said second pulley and forming therewith a second annular space, a first toroidal shaped and expansible member located in said first annular space, a second toroidal shaped member in said second annular space, a piston and cylinder means for rotating said sleeve through a predetermined annular movement, and means for supplying fluid under pressure to said toroidal shaped members for inflating the same and for operatively connecting said pulleys to said flanges when said drum is stationary, said fluid supplying means being connected to said piston and cylinder means to effect rotation of said sleeve after said toroidal shaped members have been inflated.

12. In a tire building drum of the type comprising a plurality of arched segments whose outer surfaces form a continuous cylindrical surface when the drum is in an expanded condition, wherein the segments are supported by articulated arms connected in part to a hub rigidly associated with a shaft that rotates with the drum and in part to a sleeve freely mounted on said hub and normally rotating therewith, and wherein, upon rotating the sleeve in one direction with respect to the hub, the articulated arms will cause the segments constituting the drum to be folded and partially superimposed toward the center of the drum so as to collapse said drum, the improvement which comprises means for holding said shaft against rotation and means for rotating said sleeve relative to said shaft whereby said drum can be collapsed and expanded when in a stationary condition.

References Cited in the file of this patent

UNITED STATES PATENTS

| | | |
|---|---|---|
| 2,020,497 | Bostwick | Nov. 12, 1935 |
| 2,501,644 | Kraft et al. | Mar. 21, 1950 |
| 2,517,889 | Kuffler | Aug. 8, 1950 |
| 2,614,951 | Iredell | Oct. 21, 1952 |